United States Patent [19]

Lace

[11] 4,056,255
[45] Nov. 1, 1977

[54] VALVE ACTUATOR

[76] Inventor: Donald A. Lace, 5041 Galway Circle, Huntington Beach, Calif. 92649

[21] Appl. No.: 575,484

[22] Filed: May 8, 1975

[51] Int. Cl.$^2$ .............................................. F16K 31/08
[52] U.S. Cl. ..................................... 251/129; 251/65; 251/137
[58] Field of Search .......................... 251/65, 129, 137

[56] References Cited

U.S. PATENT DOCUMENTS

| | | | |
|---|---|---|---|
| 3,368,788 | 2/1968 | Padula | 251/65 |
| 3,379,214 | 4/1968 | Weinberg | 251/65 X |
| 3,757,263 | 9/1973 | Saarem et al. | 251/129 X |
| 3,814,376 | 6/1974 | Reinicke | 251/65 |

Primary Examiner—Arnold Rosenthal

[57] ABSTRACT

An electrically operable actuator capable of being secured to a valve body to control the flow of fluid therethrough by the movement of a spring-loaded valve member supporting armature. The spring-loaded armature, at all times, tends to move to a first position where the valve member is in sealing engagement with a valve seat and flow of fluid through the valve body is obstructed. The actuator includes a permanent magnet and solenoid, each of which provides a separate source of magnetic flux. The armature is formed from magnetic stainless steel or other material having substantial permeability and low magnetic retentivity. When the magnetic flux from the permanent magnet and solenoid flow in the same direction relative to the armature, the armature is moved from a first fluid flow obstructing position to a second non-fluid flow obstructing position, and thereafter removably held in the second position by magnetic flux from the permanent magnet. When the magnetic flux from the permanent magnet is nullified, the spring moves the armature from the second to the first position.

8 Claims, 9 Drawing Figures

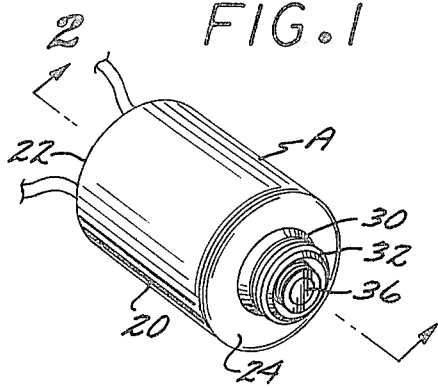
FIG. 1
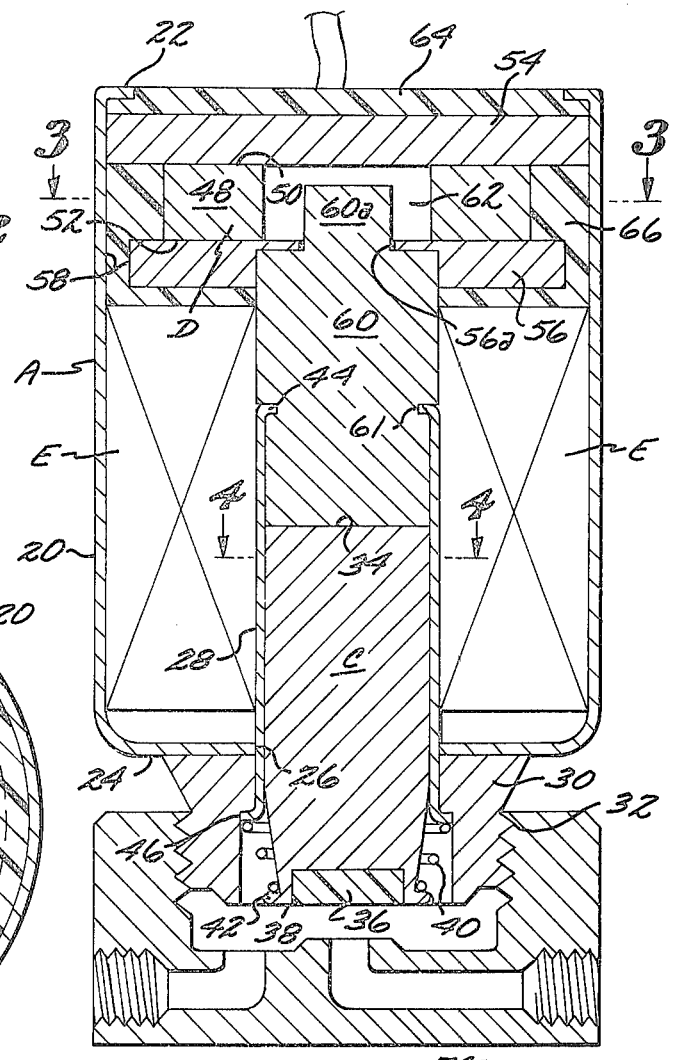
FIG. 2
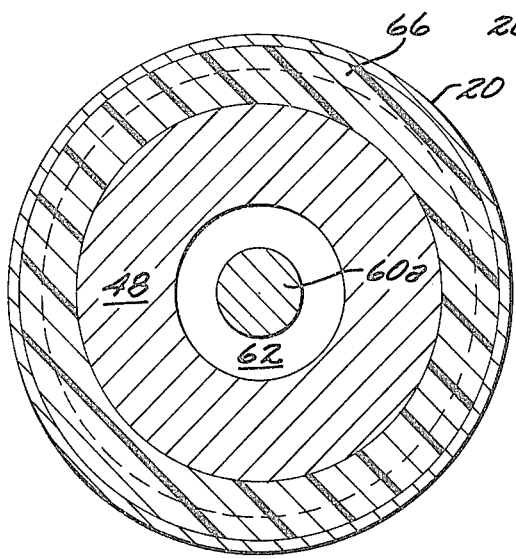
FIG. 3
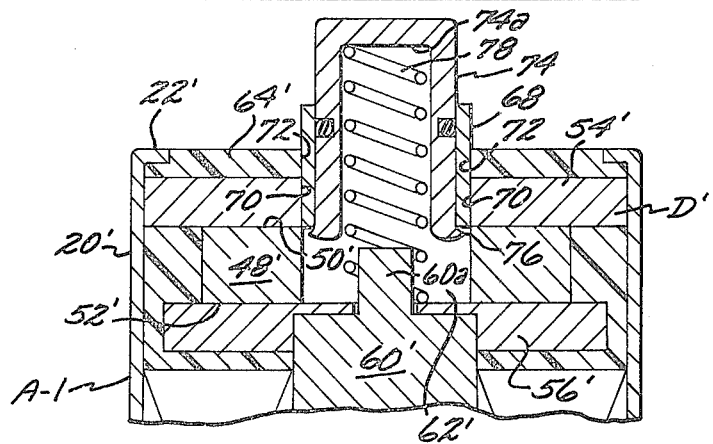
FIG. 4
FIG. 5

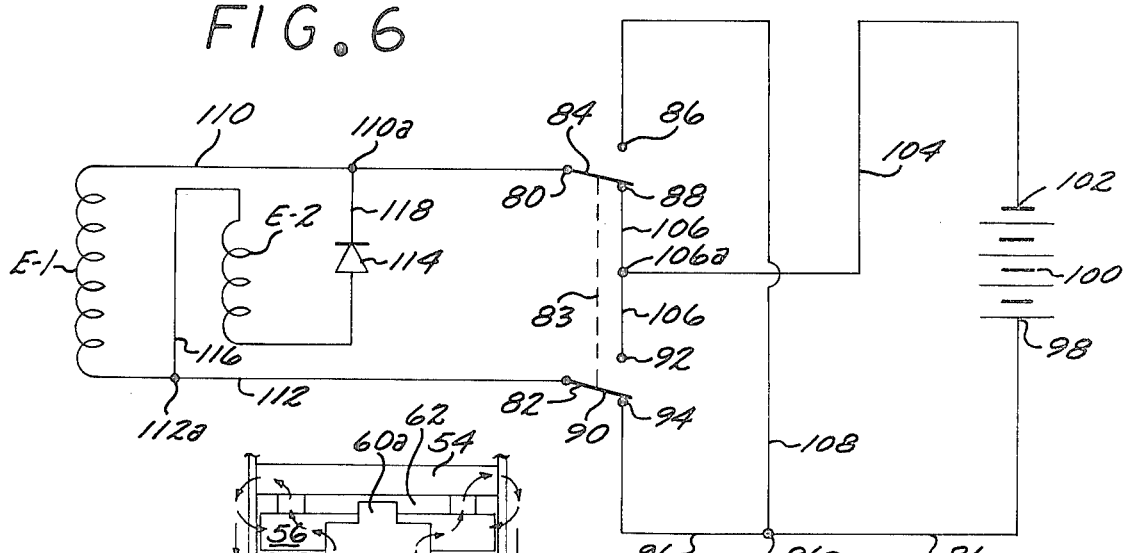
FIG. 6
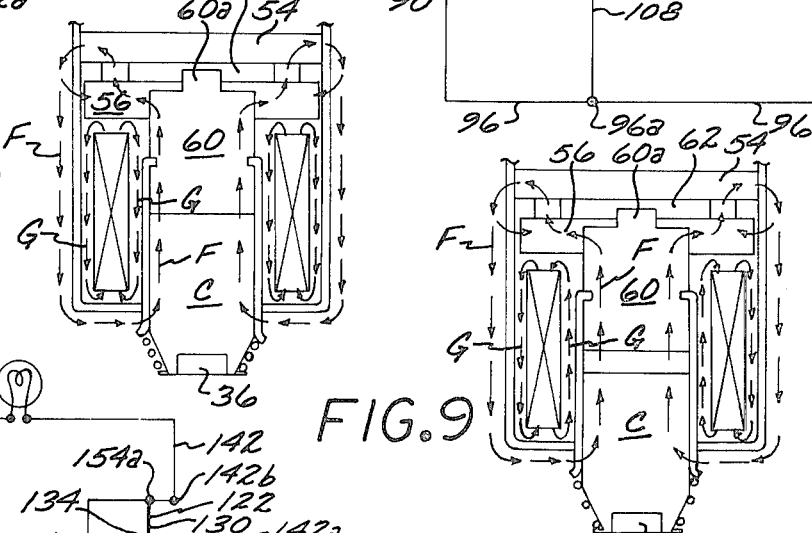
FIG. 8
FIG. 9
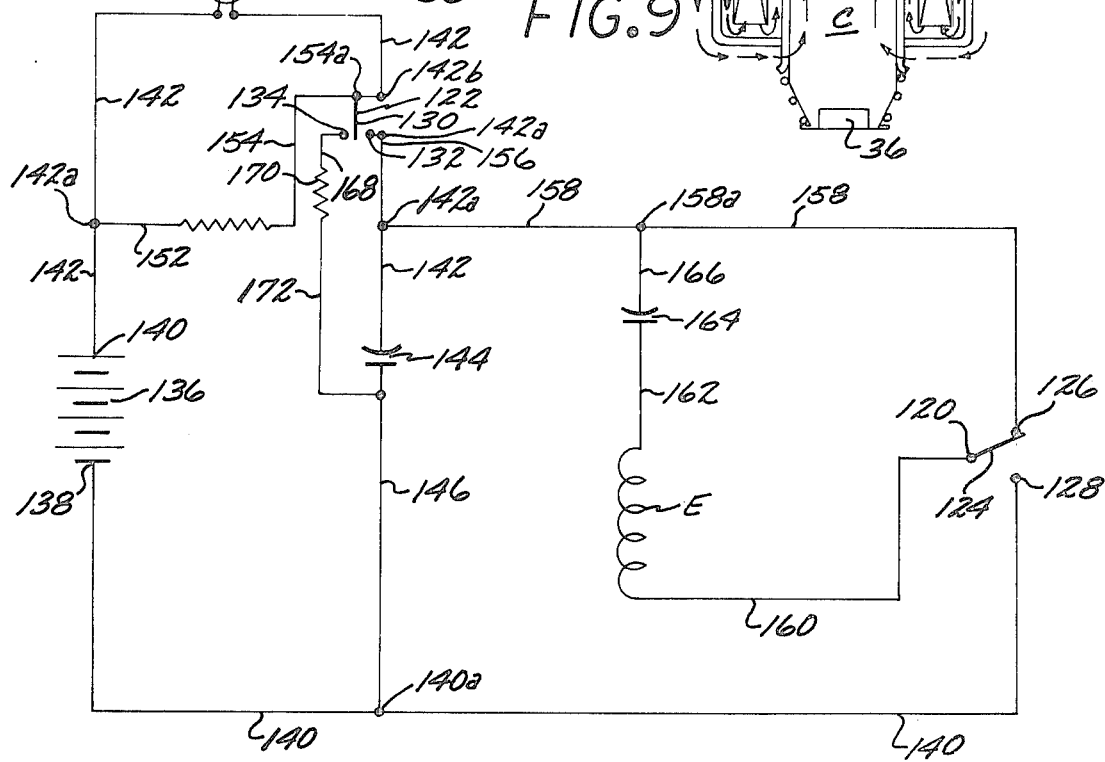
FIG. 7

VALVE ACTUATOR

BACKGROUND OF THE INVENTION

1. Field of the Invention

Valve actuator.

2. Description of the Prior Art

In certain situations it is desirable to provide an electrically operable actuator to remotely control a valve. The present invention provides such an actuator, and includes a valve member supporting armature, the movement of which is controlled by deformed spring means and magnetic flux generated by a permanent magnet and a solenoid. The deformed spring means at all times tend to move the armature to a first position where the valve member is in sealing engagement with a valve seat. When the magnetic flux from the permanent magnet and solenoid flow in the same direction through the armature, the armature is moved from the first to a second non-fluid flow obstructing position. The armature is removably held in the second position by the permanent magnet.

A primary object in devising the present invention is to supply an electrically operated actuator for a valve which permits remote control of the latter.

Another object of the invention is to furnish an electrically operable actuator in which a spring-loaded valve member supporting armature has the movement thereof controlled by selectively varying the magnetic flux from a permanent magnet and solenoid, with the armature capable of being moved to either a first position where the valve member is in sealing engagement with a valve seat to obstruct fluid flow through a valve body or to a second position where fluid can flow through the valve body.

SUMMARY OF THE INVENTION

An electrically operable actuator that is secured to a valve body having a valve seat therein, with the actuator controlling flow of fluid through the valve body. The actuator includes a ferromagnetic shell having a first open end and a second closed end. The second end has an opening formed therein through which a tubular guide extends that is in longitudinal alignment with the shell. An externally threaded boss is secured to the second end and at least partially surrounds a portion of the guide.

A magnetic stainless steel armature that has first and second ends is slidably movable within the guide. The armature on the first end supports a resilient valve member that sealingly engages the valve seat when the armature is in a first position. A permanent magnet assembly is mounted in the housing adjacent the first end thereof, and is of such polarity that the magnetic flux therefrom flows through the shell to the second end thereof, and then through the armature to return to the assembly. A deformed spring at all times tends to move the armature from the second position to the first position. A solenoid is disposed in the housing and extends around the guide.

When the solenoid is electrically energized to produce magnetic flux that flows through the armature in the same direction as magnetic flux from the permanent magnet assembly, the armature is moved from the first to the second position. The magnetic flux from the permanent magnet assembly is of sufficient strength as to hold the armature in the second position after it has been disposed therein. The spring moves the armature from the second to the first position when the magnetic flux flow through the armature is nullified.

BRIEF DESCRIPTION OF THE DRAWINGS

FIG. 1 is a perspective view of a first form of the actuator;

FIG. 2 is a longitudinal cross-sectional view of the actuator, taken on the line 2—2 of FIG. 1;

FIG. 3 is a transverse cross-sectional view of the actuator, taken on the line 3—3 of FIG. 2;

FIG. 4 is a fragmentary transverse cross-sectional view of the actuator, taken on the line 4—4 of FIG. 3;

FIG. 5 is a partial longitudinal cross-sectional view of an alternate form of actuator;

FIG. 6 is a diagram of an electric circuit that may be used with the actuators;

FIG. 7 is a diagram of another electric circuit that may be used with the actuators;

FIG. 8 is the same view as shown in FIG. 2 and illustrating the paths of magnetic flux that allow the deformed spring to move the armature from a second to a first position; and FIG. 9 is the same view as shown in FIG. 2 and illustrating the paths of magnetic flux that move the armature from a second to a first position.

DESCRIPTION OF THE PREFERRED EMBODIMENT

The first form A of the actuator is shown in perspective in FIG. 1, and mounted on a valve body B in FIG. 2. The valve body B has an intermediate passage 10 therein in which a valve seat 12 is defined. The valve body B includes a fluid outlet passage 14 that is in communication with the valve seat 12, and an inlet passage 16 that is at all times in communication with the intermediate passage 10. The intermediate passage 10 on the outer portion thereof has threads 18 formed thereon.

The first form A of the actuator, as best seen in FIGS. 2 and 3, includes a cylindrical shell 20 formed from a ferromagnetic material. Shell 20 has a first open end 22 and a closed second end 24. The second end 24 has a centralized opening 26 therein through which a tubular guide 28 extends. The guide 28 is longitudinally aligned with the cylindrical shell 20 and projects both inwardly and outwardly therefrom. Guide 28 is formed from a ferromagnetic material. The second ends 24 of the shell 20 has a tubular boss 30 secured thereto and extending outwardly therefrom, with the boss surrounding a portion of the guide 28.

An elongate magnetic steel armature C is provided that has a first end 34, and a second end 38 on which a resilient valve member 36 is mounted in a recess formed therein as shown in FIG. 2. A compressed helical spring 40 extends around the outer portion of the armature C, with one end of the spring being in abutting contact with a circular lip 42 that extends outwardly from the armature, and the opposite end of the spring being in abutting contact with a flared second end 46 of the guide 28. The first end 44 of guide 28 is disposed within the confines of the cylindrical shell 20 as shown in FIG. 2.

Actuator A also includes a permanent magnet assembly D best seen in FIG. 2. The assembly D includes a transversely, permanently magnetized ring 48 that has a first side surface 50 and second side surface 52. Assembly D has a first circular plate 54 of a ferromagnetic material in abutting contact with the first side surface 50 thereof, and the periphery of the first plate being in abutting contact with the interior surface of the cylindrical shell 20.

A second circular plate 56 of ferromagnetic material is in abutting contact with the second side surface 52 of the magnetized ring 48, and the second plate 56 being of smaller diameter than that of the first plate 54. The second plate 56 forms a gap 58 with the interior surface of the cylindrical shell 20. Both the first and second plates 54 and 56 are formed from a ferromagnetic material having substantial magnetic permeability. The second plate 56, as may be seen in FIG. 2, has a core 60 of ferromagnetic material extending therefrom towards the second end 24 of shell 20, with the core having a circumferentially extending groove 61 formed therein that is engaged by the first end 44 of guide 28 being crimped therein.

A solenoid E is situated within the confines of the shell 20, and is situated between the permanent magnet assembly D and the second ends 24 of the shell. A layer of a polymerized resin 64 closes the open end of the shell 20. A body of polymerized resin 66 encloses the space between the solenoid D and the lower surface of the first plate 54 as viewed in FIG. 2. The second plate 56 has an opening 56a therein through which an extension 60a of the core 60 projects, with the extension 60a and the interior surface of the magnetized ring, as well as the lower surface of the first plate 54 as viewed in FIG. 2, cooperating to define an annulus shaped confined space 62.

The permanent magnet assembly D produces magnetic flux, which flux has a major portion thereof flowing through a path indicated by arrows F in FIGS. 8 and 9. The path indicated by the arrows F as shown in FIGS. 6 and 7 is upwardly from the ring 48 through the first plate 54 then downwardly through the cylindrical shell 20 and second end 24 thereof, upwardly through the armature C, as well as upwardly through the core 60 to return to the magnetized ring 48. The magnetic flux so established and indicated by arrows F is in such a direction and of such strength as to hold the magnetic stainless steel core C in the second position shown in FIG. 8, despite the tendancy of the spring 40 to move the core C from the first position shown in FIG. 8 to the second position illustrated in FIG. 9. The solenoid E as can be seen in FIG. 6, includes first and second windings E-1 and E-2 respectively. When first winding E-1 is electrically energized by current flow thereto in a first direction, by means that will later be explained, a magnetic flux is set up by the solenoid as can be seen in FIG. 8 and indicated by arrows G in such a direction of flow through armature C as to nullify the magnetic flux F flowing through the armature C. The spring 40 as a result thereof is free to move the armature C from the second position shown in FIG. 8 to the first position illustrated in FIG. 9 where the valve member 36 is in sealing engagement with the valve seat 12.

When the first and second solenoid windings E-1 and E-2 are concurrently electrically energized by current flow thereto in a second direction, the solenoid windings generate a magnetic flux G that has a path of flow through the armature C and core 60 in the same direction as the magnetic flux F from the permanent magnet assembly D, and the armature C as a result thereof is moved upwardly against the force exerted by the spring 40 to the second position shown in FIG. 8. The armature C, when disposed in the second position, is held therein by the magnetic flux F, after the magnetic flux G from both the solenoid windings E-1 and E-2 is discontinued.

An alternate form A-1 of the actuator is shown in FIG. 5. Elements in this alternate form A-1 which are common to the actuator A are identified by the same numerals and letters previously used, but to which primes have been added. Actuator A-1 includes a tubular sleeve 68 that is disposed in aligned openings 70 and 72 formed in first plate 54' and layer 64'. An inverted cup 74 is longitudinally movable in sleeve 68. Cup 74 has a flared first end 76 to prevent the cup from being disengaged from the sleeve due to an upwardly directed force exerted by a compressed helical spring 78. The ends of the spring 78 are in abutting contact with a surface 74a of the cup and the upper surface of second plate 56'. An O-ring 80 is carried in a circular transverse groove 82 formed in cup 74, with the O-ring slidably and sealingly engaging the interior surface of sleeve 68.

When the cup 74 is manually forced inwardly from the position shown in FIG. 5 to a position where first end 76 contacts the upper surface of second plate 56', the major portion of magnetic flux F from permanent magnet assembly D' flows through the cup rather than through the shell 20'. When such movement of cup 74 occurs, the spring 40 moves armature C from the second to the first position as previously described. Electrical energization of solenoid E by current flow in an appropriate direction when cup 74 is in the position shown in FIG. 5 moves the armature C from the first to the second position in the same manner as occurs when actuator A is used.

The guide 28 used in both forms A and A-1 of the actuator is preferably hexigonal in transverse cross section and is formed from a ferromagnetic material. Armature C has a transverse cross section that conforms to the cross section of the guide 28. Magnetic stainless steel has been used satisfactorily for armature C, but other materials that have a high magnetic permeability and low magnetic retentivity may be used if desired.

An electric circuit is shown in FIG. 6 that may be used to selectively energize first winding E-1 or to concurrently energize both the first and second windings E-1 and E-2. The circuit includes first and second single pole, double throw switches 80 and 82 that are tandem connected by conventional means 83 to operate concurrently.

First switch 80 includes a first blade 84 that may selectively engage either first or second contacts 86 or 88. The second switch 82 includes a blade 90 that may selectively engage either first or second contacts 92 or 94. Second contact 94 has a conductor 96 extending therefrom to a first terminal 98 of a source of electric power 100, which source is illustrated in FIG. 6 as a battery. A second terminal 102 of source 100 is connected by a conductor 104 to a junction point 106a in a conductor 106, and the last mentioned conductor connected to a second contact 88 and first contact 92. First contact 86 is connected by a conductor 108 to junction point 96a.

First solenoid winding E-1 is connected by conductors 110 and 112 to blades 84 and 90. Second solenoid winding E-2 and diode 114 in series therewith are connected by conductors 116 and 118 to junction points 112a and 110a as shown in FIG. 6.

When switch blades 84 and 90 are in engagement with second contacts 88 and 94 as shown in FIG. 6, electric current flows concurrently through both windings E-1 and E-2 to generate magnetic flux G that flows in the same direction as flux F through armature C, and moves the armature C of actuator A from the first position shown in FIG. 9 to the second position illustrated in FIG. 8.

When blades 84 and 90 are in engagement with first contacts 86 and 92, electric current flows in a reverse direction to first winding E-1 only due to diode 114. This flow of current generates magnetic flux G in a direction that nullifies flux F through armature C, and as a result spring 40 is able to move the armature from the second position shown in FIG. 6 to the first position illustrated in FIG. 7.

A second electric circuit is shown in FIG. 7 that may be used to control actuators A or A-1. This circuit includes first and second single pole, double throw switches 120 and 122 respectively. First switch 120 includes a blade 124 and first and second contacts 126 and 128. Second switch 122 includes a blade 130 and first and second contact 132 and 134. A source of electric power 136 has a first and second contact 132 and 134. A source of electric power 136 has a first terminal 138 thereof connected by a conductor 140 to second contact 128.

A second terminal 140 of source of electric power 136 is connected by a conductor 142 to one side of a capacitor 144, and the other side of the capacitor being connected by a conductor 146 to a junction point 140a. Conductor 142 is connected to an incandescent bulb 148. A variable resistor 150 is connected to conductors 152 and 154, which conductors extend to junction points 142a and 142b respectively. Blade 130 is connected to junction point 154a. First contact 132 is connected to a junction point 142c by a conductor 156. Junction point 142d is connected by a conductor 158 to first contact 126.

Solenoid E that has but a single winding has one terminal connected by a conductor 160 to blade 124 and the other terminal by a conductor 162 to one side of a second capacitor 164. Capacitor has the opposite side connected by a conductor 166 to junction point 158a.

The incandescent bulb 148 serves two functions, first, to determine whether battery 136 is charged, and second to limit the current drain on the system. When the filament of bulb 148 is heated the resistance thereof increases. When blade 130 is placed in engagement with contact 134 a circuit is completed from the battery 136 to bulb 148. If battery 136 has a charge thereon the bulb 148 will be illuminated. To operate solenoid E, blade 130 is moved into engagement with contact 132 to permit the capacitors 144 and 164 to become charged.

Second contact 134 is by a conductor 168 connected to a resistor 170, which resistor has a conductor 172 extending therefrom to a junction point 146a. By moving the blade 124 between contacts 126 and 128 the direction of current flow through solenoid E can be reversed to provide magnetic flux G that will either augment flux F or nullify flux F to move the armature C from the first to the second position or allow the spring 40 to move the armature from the second to the first position.

The use and operation of the invention has been explained previously in detail and need not be repeated.

I claim:

1. In combination with a valve body having an intermediate passage that has a valve seat therein, said valve body having a fluid inlet and fluid outlet that are at all times in communication with said intermediate passage and said valve seat respectively, a device operable from a source of electric power for controlling the flow of fluid through said valve body, which device includes:
   a. a housing assembly that includes a cylindrical shell formed of a material having substantial magnetic permeability, said shell having a first open end and a second closed end that has an opening formed therein, a tubular guide having first and second ends, which guide is longitudinally aligned relative to said shell and extends through said opening, and first means for securing said housing assembly to said valve body with said guide being axially aligned with said valve seat;
   b. an elongate armature having first and second ends, with said armature being slidably mounted in said guide, and said armature being formed from a ferromagnetic material having substantial permeability and low retentivity;
   c. a resilient valve member on said second end of said armature that sealingly engages said valve seat when in a first position and in pressure contact therewith;
   d. second means that at all times exert a first force on said armature in a direction that tends to move said armature to said first position;
   e. a solenoid in said housing that extends around at least a portion of said guide, with said solenoid being capable of energization from said source of electric power;
   f. permanent magnet means of fixed polarity in said housing, said permanent magnet means adjacent said first end of said shell, said fixed polarity being such that the direction of the major portion of the magnetic flux from said permanent magnet means is through said shell and armature to tend to hold said armature in a second position where said valve member is spaced from said valve seat and fluid may flow from said inlet to said outlet, with said magnetic flux being of sufficient strength to overcome said first force exerted by said second means when said armature is in said second position but now when said armature is in said first position; said permanent magnet means including:
      1. a permanent transversely magnetized ring having first and second side surfaces;
      2. first and second plates of a material having substantial magnetic permeability that are in abutting contact with said first and second side surfaces of said ring, said first plate in abutting contact with the interior of said shell, said second plate defining an air gap with the interior surface of said shell; and
      3. a core of material having substantial magnetic permeability that projects from said second plate into the interior of said solenoid;
   g. third means for momentarily nullifying the flow of said magnetic flux through said shell and armature to permit said second means to move said armature to said first position; and
   h. fourth means for electrically energizing said solenoid when said third means is not operating that said magnetic flux from said permanent magnet means and the magnetic flux from said solenoid concurrently flow through said armature in the same direction and exert a second force on said armature that is greater than said first force to move said armature from said first to said second position.

2. The device as defined in claim 1 wherein said first means is an externally threaded tubular boss secured to said second end of said shell that engages internal threads on that portion of said valve body which defines said intermediate passage.

3. The device as defined in claim 2 wherein said second means is a compressed helical spring disposed within said tubular boss, with one end of said spring secured to said armature, and with the opposite end of said spring occupying a fixed position relative to said guide.

4. The device as defined in claim 1 wherein said guide is permanently secured to said core.

5. The device as defined in claim 1 wherein said first plate has a centered opening therein and said third means is a spring-loaded plunger formed from a material having substantial magnetic permeability that may be forced towards said second end of said shell to have a portion of said plunger disposed within said magnetized ring to direct the flow of magnetic flux from said ring away from said shell.

6. The device as defined in claim 1 wherein said solenoid has first and second windings thereon, and said third means is a normally open switch that when closed, permits electric current to flow from said source of electric power to said solenoid in a first direction for said first winding to generate electric flux that opposes said electric flux from said permanent magnet means and permits said second means to move said armature from said second to said first position.

7. The device as defined in claim 1 which in addition includes a second solenoid and wherein said fourth means is a normally open switch which when in a closed position permits electric current to flow from said source of electric power to both said first and second solenoids to generate electric flux in a direction to augment said electric flux from said permanent magnet means and move said armature against the force offered by said second means from said first to said second position.

8. The device as defined in claim 1 wherein said solenoid has first and second windings thereon, and said device in addition including an electric circuit connecting said first and second windings to said source of electric power, a diode in said circuit in series with said second winding, and said third and fourth means being a pair of single pole, double throw switch in said circuit that operate concurrently, said pair of switches when in a first position completing said circuit to said first winding only due to said diode by current flow in a first direction to generate magnetic flux in said first winding that opposes said flux from said permanent magnet means and allows said second means to move said armature from said second to said first position and said pair of switches when in second positions completing said circuit to both said first and second windings by current flow in a second direction thereto to generate magnetic flux in a direction that augments said magnetic flux from said permanent magnet means and moves said armature from said first to said second position.

* * * * *